US006839712B1

United States Patent
Kumhyr et al.

(10) Patent No.: US 6,839,712 B1
(45) Date of Patent: Jan. 4, 2005

(54) PRE-PROCESSING CODE TO IDENTIFY AND MODIFY FORMAT OF KEYS

(75) Inventors: David Bruce Kumhyr, Austin, TX (US); Keiichi Yamamoto, Austin, TX (US); Kin Hung Yu, Austin, TX (US); Dae-Suk Chung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 09/697,445

(22) Filed: Oct. 26, 2000

(51) Int. Cl.[7] .................................................. G06F 17/00
(52) U.S. Cl. ........................................... 707/101; 707/5
(58) Field of Search ..................... 707/1–10, 100–103, 707/513; 717/173, 5

(56) References Cited

U.S. PATENT DOCUMENTS

| | | | | |
|---|---|---|---|---|
| 5,678,039 A | * | 10/1997 | Hinks et al. | 707/4 |
| 5,745,908 A | * | 4/1998 | Anderson et al. | 715/513 |
| 5,864,866 A | | 1/1999 | Henckel et al. | 707/103 |
| 5,943,497 A | * | 8/1999 | Bohrer et al. | 717/121 |
| 5,966,702 A | | 10/1999 | Fresko et al. | 707/1 |
| 6,014,680 A | * | 1/2000 | Sato et al. | 715/513 |
| 6,072,953 A | * | 6/2000 | Cohen et al. | 717/166 |
| 6,202,201 B1 | * | 3/2001 | Domi | 717/136 |
| 6,324,686 B1 | * | 11/2001 | Komatsu et al. | 717/148 |
| 6,442,576 B1 | * | 8/2002 | Edelman et al. | 715/513 |
| 6,457,176 B1 | * | 9/2002 | King | 717/173 |

* cited by examiner

Primary Examiner—Greta Robinson
Assistant Examiner—S R Pannala
(74) Attorney, Agent, or Firm—Robert A. Voigt, Jr.; Kelly K. Kordzik; Jeffrey S. LaBau

(57) ABSTRACT

A method, computer program product and data processing system for identifying and modifying the format of keys in a resource file source code and in the associated a program code. In one embodiment of the present invention, a program reads a resource file source code for keys written in a non-standard format. Upon detecting one or more keys written in a non-standard format in the resource file source code, the program modifies the format of those one or more keys so that they are written in a standard format. The program may then read the associated program code for any text that matches the written format of the one or more keys written in the non-standard format. Upon detecting any text that matches the written format of the one or more keys written in the non-standard format, the program replaces any matched text with the updated written format, i.e. standard format, of the one or more keys whose format was modified. In another embodiment of the present invention, a report may be generated which indicates the modifications of the format of the one or more keys in the resource file source code and in the associated program code. In another embodiment of the present invention, the user of the program may be provided an option as to whether or not to save the modifications of the format of the one or more keys in the resource file source code and in the associated program code.

24 Claims, 3 Drawing Sheets

PRE-PROCESSING CODE TO IDENTIFY AND MODIFY FORMAT OF KEYS

CROSS REFERENCE TO RELATED APPLICATIONS

The present invention is related to the following U.S. patent applications which are incorporated herein by reference:

Ser. No. 09/697,446 filed Oct. 26, 2000 entitled "Identifying Non-Externalized Text Strings That Are Not Hard-Coded" filed Oct 26, 2000.

Ser. No. 09/697,448 filed Oct. 26, 2000 entitled "Detection of Resource Exceptions" filed Oct. 26, 2000.

TECHNICAL FIELD

The present invention relates to the field of internationalization, and more particularly to a program that identifies and modifies the format of keys in the resource file and associated program code thereby preventing keys from being identified as hard-coded strings.

BACKGROUND INFORMATION

Internationalization is a process of enabling a program, e.g., Java, to run internationally. That is, an internationalized program has the flexibility to run correctly in any country. An internationalized program must be able to read, write and manipulate localized text. Furthermore, an internationalized program must conform to local customs when displaying dates and times, formatting numbers and sorting strings.

Internationalization is becoming increasingly important with the explosive growth of the Internet and the World Wide Web where an ever increasing number of computer users are from various locales. A locale represents a geographic, cultural or political region. One of the problems with internationalization involves the use of text strings that may be hard-coded in the program, e.g., Java. Hard-coded text strings refer to text that will not vary with the locale. That is, the text strings may appear in English even when the program is run on the French locale. Various object-oriented languages such as Java have developed tools to assist in developing internationalized programs and allowing text strings to appear in the language of the locale. A discussion of object-oriented programming languages and in particular Java is deemed appropriate.

In an object-oriented programming language such as Java, a class is a collection of data and methods that operate on that data. The data and methods taken together describe the state and behavior of what is commonly referred to as an object. An object in essence includes data and code where the code manipulates the data. Hence a software application may be written using an object-oriented programming language such as Java whereby the program's functionality is implemented using objects.

Unlike many programming languages, Java is compiled into machine independent code commonly referred to as bytecodes instead of machine dependent code, i.e. native executable code. Bytecodes are stored in a particular file format commonly referred to as a "class file" that includes bytecodes for methods of a class. In addition to the bytecodes for methods of a class, the class file includes a symbol file as well as other ancillary information.

A computer program embodied as Java bytecodes in one or more class files is platform independent. The computer program may be executed, unmodified, on any computer that is able to run an implementation of what is commonly referred to as a Java Virtual Machine. The Java Virtual Machine is not an actual hardware platform, but rather a low level software emulator that can be implemented on many different computer processor architectures and under many different operating systems. The Java Virtual Machine reads and interprets each bytecode so that the instructions may be executed by the native processor. Hence a Java bytecode is capable of functioning on any platform that has a Java Virtual Machine implementation available. However, bytecode interpretation detracts from processor performance since the microprocessor has to spend some of its processing time interpreting bytecode instructions. Compilers commonly referred to as "just in time (JIT)" were developed to improve the performance of Java Virtual Machines. A JIT compiler translates Java bytecodes into the processor's native machine code during runtime. The processor then executes the compiled native machine code.

As stated above Java has developed tools to assist in developing internationalized programs and allowing text strings to appear in the language of the locale. One such tool is the use of resource files commonly referred to in Java as resource bundles. A resource bundle class may be used for externalizing text strings, i.e. messages. By externalizing text strings, appropriate text strings appear in the language of the locale. The resource bundle class is an associative array of keys and values. Keys are free formatted strings that appear in the program code as well as in the resource bundle thereby allowing the program to access the externalized string. Externalized strings may be represented as a value associated with the key. That is, appropriate text strings for a given locale are indexed by keys. By having resource bundles associated with particular locales, e.g., a resource file with resources associated with the U.S. English locale, a resource file with resources associated with the French locale and so forth, appropriate text strings associated with the particular locale may be loaded at runtime.

However, software developers may still hard-code their strings into their application instead of externalizing them and loading them from the resource file, e.g., resource bundle. Various scanning programs have been developed which attempt to detect hard-coded strings. Unfortunately, these scanning programs simply detect as hard-coded strings all text enclosed within double quotes (" ") which are used as string delimiters in Java (as well as other programming languages). However, not all text enclosed within double quotes are hard-coded strings. The text enclosed within the double quotes may be keys that are used to index appropriate text strings for a given locale.

It would therefore be desirable to develop a program that identifies and modifies the format of keys in the resource file and the associated program code thereby preventing keys from being identified as hard-coded strings.

SUMMARY

The problems outlined above may at least in part be solved in some embodiments by a program detecting one or more keys written in a non-standard format in a resource file source code. Non-standard format refers to any format that does not conform to a standard format where the standard format allows a scanning tool to identify keys as not being hard-coded strings. Upon detecting one or more keys written in a non-standard format in the resource file source code, the program modifies the format of those one or more keys so that they are written in a standard format. The program may then store the written format of the one or more keys previously written in a non-standard format. The program may further store the modified written format, i.e. standard format, of the one or more keys whose format was modified. The program may then search the associated program code for any text that matches the written format of the one or more keys written in the non-standard format. Upon detecting any text that matches the written format of the one or more keys written in the non-standard format, the program replaces any matched text with the updated written format, i.e. standard format, of the one or more keys whose format was modified.

In one embodiment, a method for identifying and modifying the format of keys comprises the step of reading a resource file source code for keys written in a first format, i.e. non-standard format. The method further comprises the step of detecting one or more keys written in the first format within the resource file source code. The method further comprises the step of modifying the format of those one or more keys that were detected for being written in the first format to be written in a second format, i.e. standard format. The method further comprises the step of searching an associated program code for text that matches the one or more keys written in the first format. The method further comprises the step of replacing the text that matches the one or more keys written in the first format with the one or more keys written in the second format.

In another embodiment of the present invention, the method comprises the step of storing the one or more keys written in the first format. The method further comprises the step of storing the one or more keys written in the second format. In another embodiment of the present invention, the method comprises the step of generating a report where the report includes the modifications of the format of one or more keys in the resource file source code and in the associated program code. In another embodiment of the present invention, the user of the program may be provided an option for saving the modifications of the format of the one or more keys in the resource file source code and in the associated program code.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and data processing system for identifying and modifying the format of keys in a resource file source code and in the associated program code. In one embodiment of the present invention, a program reads a resource file source code for keys written in a non-standard format. Non-standard format refers to any format that does not conform to a standard format where the standard format allows a scanning tool to identify keys as not being hard-coded strings. Upon detecting one or more keys written in a non-standard format in the resource file source code, the program modifies the format of those one or more keys so that they are written in a standard format. The program may then store the written format of the one or more keys previously written in a non-standard format. The program may further store the modified written format, i.e. standard format, of the one or more keys whose format was modified. The program may then search the associated program code for any text that matches the written format of the one or more keys written in the non-standard format. Upon detecting any text that matches the written format of the one or more keys written in the non-standard format, the program replaces any matched text with the updated written format, i.e. standard format, of the one or more keys whose format was modified. In another embodiment of the present invention, a report may be generated which indicates the modifications of the format of the one or more keys in the resource file source code and in the associated program code. In another embodiment of the present invention, the user of the program may be provided an option as to whether or not to save the modifications of the format of the one or more keys in the resource file source code and in the associated program code.

Figure 1:
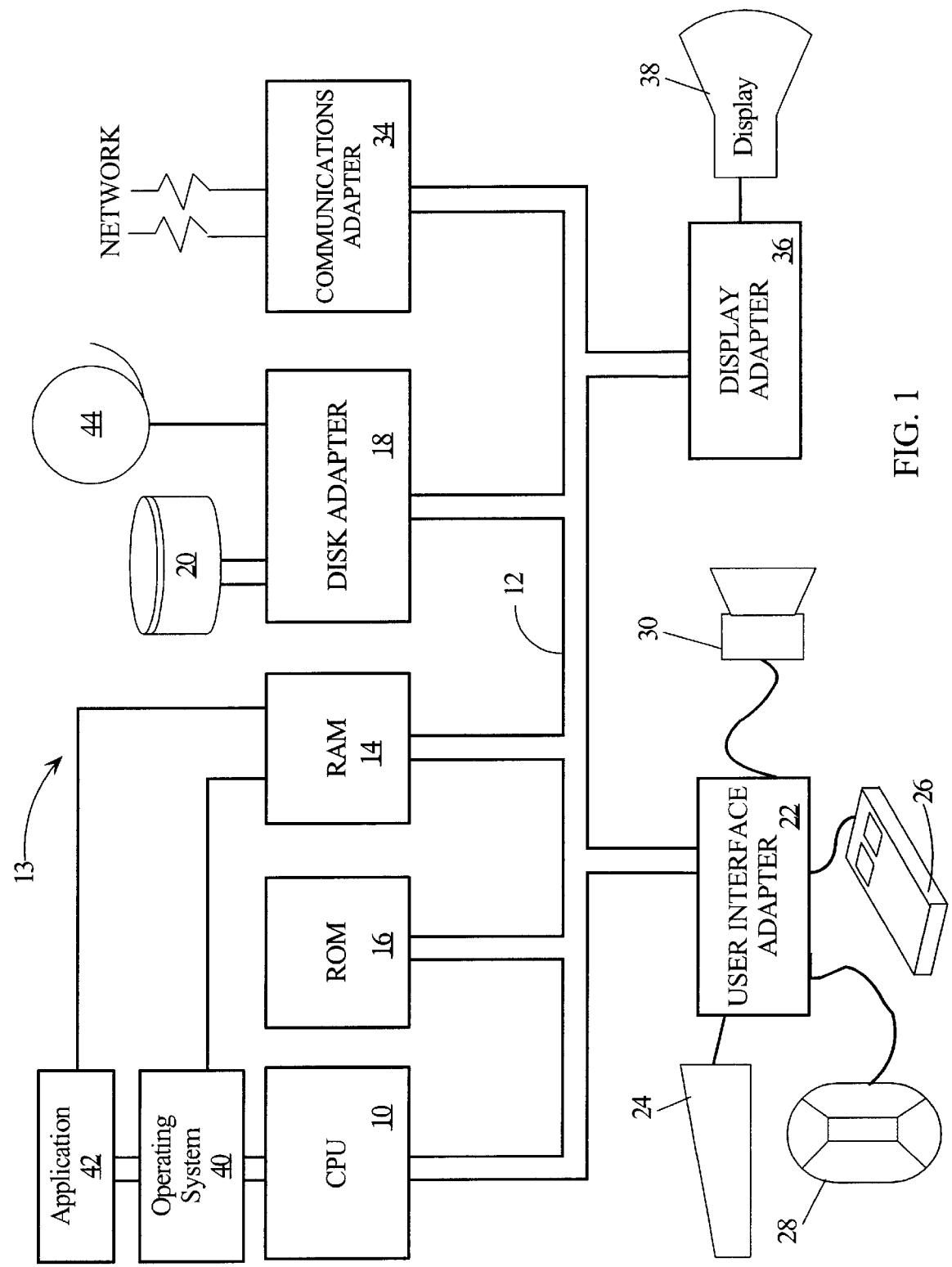
FIG. 1 illustrates a data processing system configured in accordance with the present invention.

FIG. 1-Computer System

FIG. 1 illustrates a typical hardware configuration of data processing system 13 which is representative of a hardware environment for practicing the present invention. Data processing system 13 has a central processing unit (CPU) 10, such as a conventional microprocessor, coupled to various other components by system bus 12. An operating system 40, e.g., DOS, OS/2™, runs on CPU 10 and provides control and coordinates the function of the various components of FIG. 1. An object-oriented programming system, such as Java 42, runs in conjunction with operating system 40 and provides output calls to operating system 40 which implements the various functions to be performed by the application 42. Read only memory (ROM) 16 is coupled to system bus 12 and includes a basic input/output system ("BIOS") that controls certain basic functions of data processing system 13. Random access memory (RAM) 14, I/O adapter 18, and communications adapter 34 are also coupled to system bus 12. It should be noted that software components including operating system 40 and application 42 are loaded into RAM 14 which is the computer system's main memory. I/O adapter 18 may be a small computer system interface ("SCSI") adapter that communicates with disk units 20, e.g., disk drive, and tape drives 40. It is noted that the program of the present invention that identifies and modifies the format of keys may reside in disk unit 20 or in application 42. It is further noted that the program of the present invention may reside within a scanning tool, i.e. scanning program, or as a separate program. Communications adapter 34 interconnects bus 12 with an outside network enabling data processing system 13 to communication with other such systems. Input/Output devices are also connected to system bus 12 via a user interface adapter 22 and a display adapter 36. Keyboard 24, trackball 28, mouse 26 and speaker 30 are all interconnected to bus 12 through user interface adapter 22. Event data may be input to the object-oriented programming system through any of these devices. A display monitor 38 is connected to system bus 12 by display adapter 36. In this manner, a user is capable of inputting to system 13 through keyboard 24, trackball 28 or mouse 26 and receiving output from system 13 via display 38 or speaker 30.

Preferred implementations of the invention include implementations as a computer system programmed to execute the method or methods described herein, and as a computer program product. According to the computer system implementations, sets of instructions for executing the method or methods are resident in the random access memory 14 of one or more computer systems configured generally as described above. Until required by the computer system, the set of instructions may be stored as a computer program product in another computer memory, for example, in disk drive 20 (which may include a removable memory such as an optical disk or floppy disk for eventual use in disk drive 20). Furthermore, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 2:
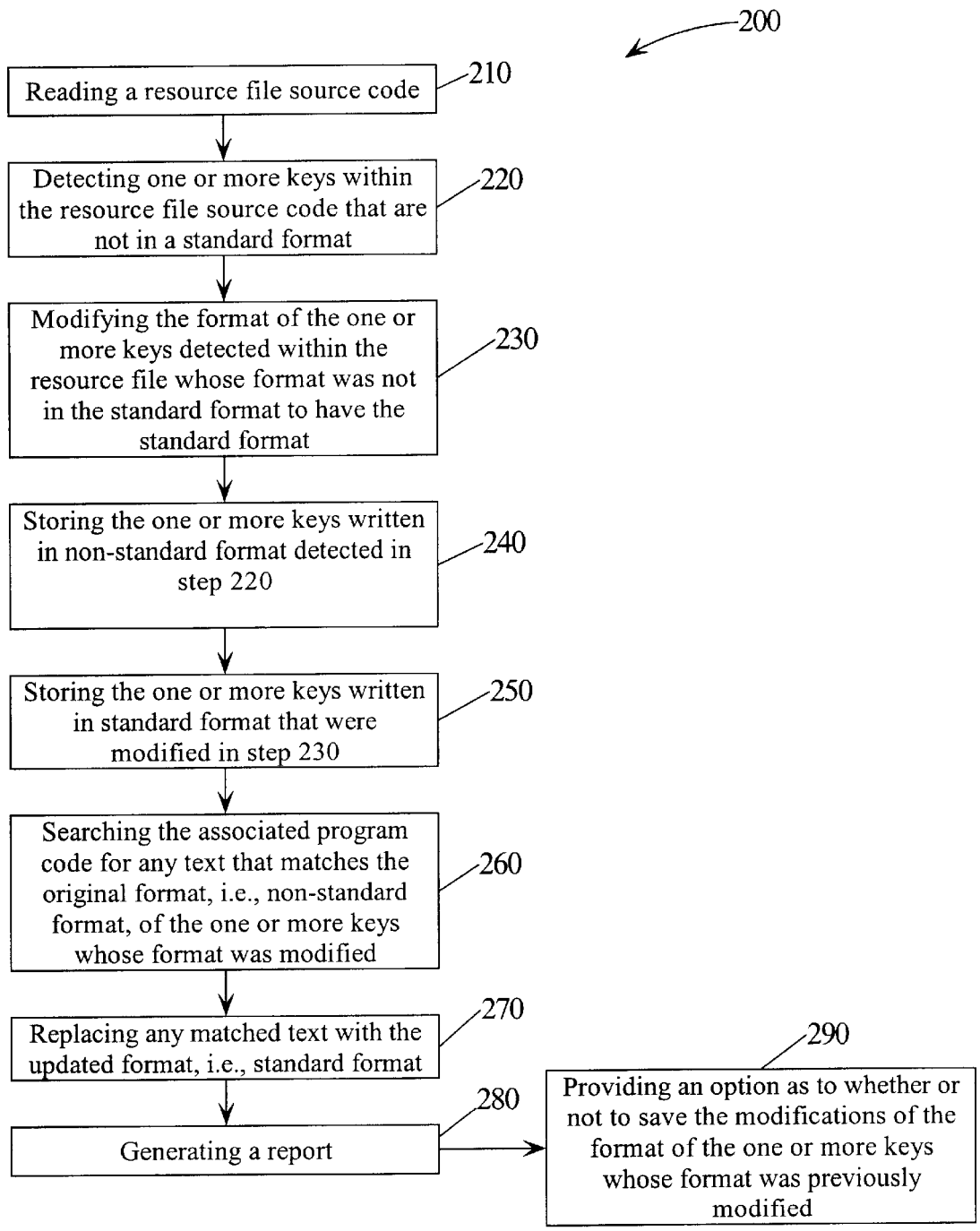
FIG. 2 is a flowchart of a method for identifying and modifying the format of keys in resource files and the associated program code.

FIG. 2-Method For Identifying and Modifying the Format of Keys

FIG. 2 illustrates a method 200 for identifying and modifying keys in a resource file, e.g., resource bundle, and in a program code 42. In one embodiment, the resource file may reside in a Java ARchive (JAR) file where the JAR file may reside in disk unit 20. As stated in the Background Information section, software developers may hard-code a their strings into the application 42 instead of externalizing them and loading them from the resource file, e.g., resource bundle. Various scanning programs have been developed which attempt to detect hard-coded strings. Unfortunately, these scanning programs simply detect as hard-coded strings all text enclosed within double quotes (" ") which are used as string delimiters in Java (as well as other programming languages). However, not all text enclosed within double quotes are hard-coded strings. The text enclosed within the double quotes may be keys that are used to index appropriate text strings for a given locale. Method 200 is a method that identifies and modifies the format of keys in the resource file and associated program code thereby preventing keys from being identified as hard-coded strings by a scanning program. It is noted that method 200 may be implemented prior to the execution of application 42, e.g., Java, and of a scanning program.

In step 210, a program reads a resource file, e.g., resource bundle, for keys that are written in non-standard format. Non-standard format refers to any format that does not conform to a standard format where the standard format allows a scanning tool to identify keys as not hard-coded strings. An example of a standard format may be to have the keys written in uppercase letters with an underscore between each word and starting with the resource file, e.g, resource bundle, class name and ending with a constant keyword "_KEY." It is noted that any standard format may be implemented as long as it allows a scanning tool to identify keys as not hard-coded strings. The following code depicts a typical resource bundle class definition written in Java code illustrating resources, i.e. key value pairs, in a resource bundle.

```
public call Res extends java.util.ListResourceBundle {
    static final Object [ ][ ] contents = {
        { "File menu", "File"},
        { "Edit menu", "Edit"},
        { "whatever", "Close"}};
    public Object [ ][ ] getContents( ) {
        return contents;
    }
}
```

In this code, "File menu", "Edit menu", and "whatever" are the keys. The values associated with those keys are the text strings "File", "Edit" and "Close", respectively.

Figure 3:
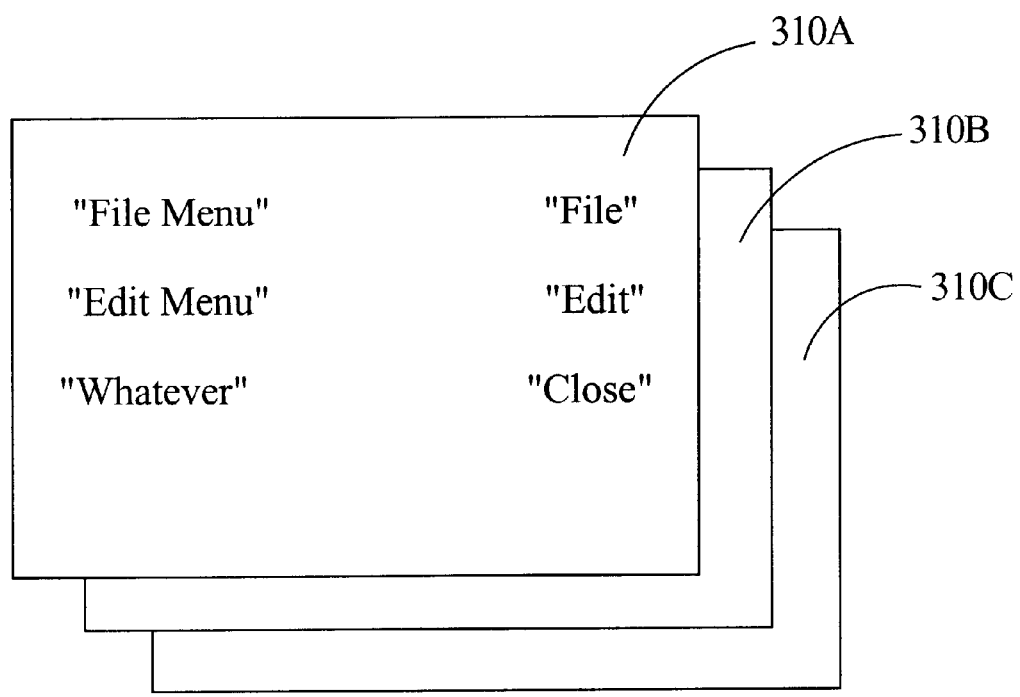
FIG. 3 illustrates key-value pairs in resource files.

An example of resource files, e.g., resource bundles, comprising key value pairs is illustrated in FIG. 3. FIG. 3 illustrates a plurality of resource files 310A–C where each resource file may be associated with a particular locale. For example, resource file 310A may be associated with the U.S. English locale. Resource file 310B may be associated with a German locale. Resource file 310C may be associated with a French locale. As stated above, these resource files, e.g., 310A–C, may reside in a Java ARchive (JAR) file where the JAR file may reside in disk unit 20. Resource files 310A–C may collectively or individually be referred to as resource files 310 or resource file 310, respectively. It is noted that any number of resource files may reside in a JAR file. Referring to FIG. 3, resource file 310A illustrates the key-value pairs for the above illustrated Java code in the U.S. English locale. Resource file 310B associated with a German locale may have the key values of "Datei", "editieren" and "Beenden" associated with the keys "File Menu", "Edit Menu" and "whatever", respectively. Resource file 310C associated with a French locale may have the key values of "fichier", IC "edition" and "fermer" associated with the keys "File Menu", "Edit Menu" and "whatever", respectively. Hence, a resource file 310 may be defined for each locale an application 42 supports. The application 42 then loads the correct resource file 310 according to the specified locale. For example, if the application 42 were running in the German locale, then when the resource loader searches for the key "File Menu", resource 115 file 310B is loaded into memory and the associated key value "Datei" is outputted.

In step 220, one or more keys may be detected within the resource file source code that are not written in the standard format. As stated above, the standard format allows a scanning tool to identify keys as not hard-coded strings. An example of a standard format may be to have the keys written in uppercase letters with an underscore between each word and starting with the resource file, e.g, resource bundle, class name and ending with a constant keyword "_KEY." It is noted that any standard format may be implemented as long as it allows a scanning tool to identify keys as not hard-coded strings. Referring to the above example Java code, the keys "File menu", "Edit menu", and "whatever" are not written in the standard format as defined above.

In step 230, the program modifies the format of the one or more keys detected within the resource file 310, e.g., resource bundle, whose format was not written in the standard format to have the standard format. For example, the written format of the keys in the resource bundle class definition written in Java code above may be modified by the program to appear as follows:

```
public class Res extends java.util.ListResourceBundle {
    static final Object [ ][ ] contents = {
        { "RES_FILE_MENU_KEY", "File" },
        { "RES_EDIT_MENU_KEY", "Edit" },
        { "RES_WHATEVER_KEY", "Close" }};
    public Object [ ][ ] getContents( ) {
      return contents;
    }
}
```

As illustrated above, the keys "File menu", "Edit menu", and "whatever" are now written in a standard format as "RES_FILE_MENU_KEY", "RES_EDIT_MENU_KEY", and "RES_WHATEVER_KEY", respectively.

In step 240, the program stores the one or more keys written in non-standard format that were detected in step 220. For example, the program may store "File Menu", "Edit menu" and "whatever." The program may store the one or more keys written in non-standard format that were detected in step 220 in any type of memory medium such as disk unit 20.

In step 250, the program stores the one or more keys written in standard format that were modified in step 230. For example, the program may store "RES_FILE_MENU_KEY", "RES_EDIT_MENU_KEY", and "RES_WHATEVER_KEY." The program may store the one or more keys written in standard format that were modified in step 230 in any type of memory medium such as disk unit 20.

In step 260, the program searches the associated program code for any text that matches the one or more keys written in the non-standard format stored in step 240. The associated program code refers to the program code that accesses text defined in the resource file 310 that was read in step 210. For example, the following program code written in Java accesses text defined in the resource bundle class defined above.

menu1.setText(ResourceLoader.getBundle (rb, "File menu"));//File
menu2.setText(ResourceLoader.getBundle (rb, "Edit menu"));//Edit
button1.setText(ResourceLoader.getBundle (rb, "whatever"));//Close
button2.setText("Cancel"); // Hard-coded string—must be externalized The first three lines of the above written Java program code include text that matches the one or more keys written in non-standard format stored in step 240. The matching text of the one or more keys written in non-standard format stored in step 240 in the above written Java program code are "File menu", "Edit menu" and "whatever." These keys would normally be interpreted as possible hard-coded strings by a scanning tool. As stated above, various scanning tools have been developed to detect hard-coded strings which simply detect as possible hard-coded strings all text enclosed with string delimiters (" "). However, not all text enclosed within double quotes are hard-coded strings. The text enclosed within the double quotes may be keys, e.g., "File menu", "Edit menu" and "whatever," that are used to index appropriate text strings for a given locale. In order to avoid detecting the keys as possible hard-coded strings, the keys may be written in a standard format thereby preventing the keys from being identified as hard-coded strings by a scanning tool.

In step 270, the program replaces text that matches the one or more keys written in non-standard format stored in step 240 with the associated one or more keys written in standard format stored in step 250. The associated one or more keys refer to the modified one or more keys in step 230. For example, the written format of the keys in the program code written above in Java may be modified by the program to appear as follows:

menu1.setText(ResourceLoader.getBundle (rb, "RES_FILE_MENU_KEY")); //File
menu2.setText(ResourceLoader.getBundle (rb, "RES_EDIT_MENU_KEY")); //Edit
button 1.setText(ResourceLoader.getBundle (rb, "RES_WHATEVER_KEY")); //Close
button2.setText ("Cancel"); //Hard-coded string—must be externalized As illustrated above, the keys "File menu", "Edit menu", and "whatever" are now written in a standard format as "RES_FILE_MENU_KEY", "RES_EDIT_MENU_KEY", and "RES_WHATEVER_KEY", respectively in the program code. A scanning tool may then be programmed to ignore keys written in a standard format as possible hard-coded strings. Hence, a scanning tool may then only report the string "Cancel" as a possible hard-coded string in the above written Java program code.

In step 280, a report may be generated that includes the modifications of the format of the one or more keys in the resource file, e.g., resource bundle, and the associated program code. In one embodiment, the report may indicate the line number in the resource file and associated program code where modifications occurred. In another embodiment, the report may further include both the original one or more keys, i.e. one or more keys written in the non-standard format stored in step 240, and the updated one or more keys, i.e. one or more keys modified to be written in standard format stored in step 250. In another embodiment, the report may include a file-name. It is noted that the report may comprise other embodiments where information as to the modifications of the keys formerly written in non-standard format are provided.

In step 290, the user of the program may be provided an option for saving the modifications of the written format of the one or more keys in the resource file 310, e.g., resource bundle, and in the associated program code.

It is noted that the program of the present invention that identifies and modifies the format of keys may reside in disk unit 20 or in application 42. It is further noted that the program of the present invention may reside within a scanning tool, i.e. scanning program, or as a separate program.

Although the method, computer program product and data processing system of the present invention are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for identifying and modifying a format of keys comprising the steps of:
   reading a resource file;
   detecting one or more keys in a first format within said resource file; and
   modifying said one or more keys within said resource file, wherein said one or more keys are modified to be in a second format.

2. The method as recited in claim 1 further comprising the steps of:

searching a program code for text that matches said one or more keys in said first format; and replacing said text that matches said one or more keys in said first format with corresponding ones of said one or more keys in said second format.

3. The method as recited in claim 2 further comprising the steps of:

storing said one or more keys written in said first format; and storing said one or more keys written in said second format.

4. The method as recited in claim 2 further comprising the step of:

generating a report, wherein said report includes modifications of the format of said one or more keys in said resource file source code and in said program code.

5. The method as recited in claim 2 further comprising the step of:

providing an option for saving the modifications of the format of said one or more keys in said resource file source code and in said program code.

6. The method as recited in claim 2, wherein said program code comprises Java code.

7. The method as recited in claim 1, wherein said resource file is a resource bundle.

8. A computer program product in a computer readable medium for identifying and modifying a format of keys, comprising:

programming operable for reading a resource file;

programming operable for detecting one or more keys in a first format within said resource file; and programming operable for modifying said one or more keys within said resource file, wherein said one or more keys are modified to be in a second format.

9. The computer program product as recited in claim 8 further comprises:

programming operable for searching a program code for text that matches said one or more keys in said first format; and programming operable for replacing said text that matches said one or more keys in said first format with corresponding ones of said one or more keys in said second format.

10. The computer program product as recited in claim 9 further comprises:

programming operable for storing said one or more keys written in said first format; and programming operable for storing said one or more keys written in said second format.

11. The computer program product as recited in claim 9 further comprises:

programming operable for generating a report, wherein said report includes modifications of the format of said one or more keys in said resource file source code and in said program code.

12. The computer program product as recited in claim 9 further comprises:

programming operable for providing an option for saving the modifications of the format of said one or more keys in said resource file source code and in said program code.

13. The computer program product as recited in claim 9, wherein said program code comprises Java code.

14. The computer program product as recited in claim 8, wherein said resource file is a resource bundle.

15. A data processing system, comprising:

a processor;

a memory unit for storing instructions of said processor;

an input mechanism;

an output mechanism;

a bus system for coupling the processor to the memory unit, input mechanism, and output mechanism;

means for reading a resource file;

means for detecting one or more keys in a first format within said resource file; and means for modifying said one or more keys within said resource file, wherein said one or more keys are modified to be in a second format.

16. The data processing system as recited in claim 15, wherein the system further comprises:

means for searching a program code for text that matches said one or more keys in said first format; and means for replacing said text that matches said one or more keys in said first format with corresponding ones of said one or more keys in said second format.

17. The data processing system as recited in claim 16, wherein the system further comprises:

means for storing said one or more keys written in said first format; and means for storing said one or more keys written in said second format.

18. The data processing system as recited in claim 16, wherein the system further comprises:

means for generating a report, wherein said report includes modifications of the format of said one or more keys in said resource file source code and in said program code.

19. The data processing system as recited in claim 16, wherein the system further comprises:

means for providing an option for saving the modifications of the format of said one or more keys in said resource file source code and in said program code.

20. The data processing system as recited in claim 16, wherein said program code comprises Java code.

21. The data processing system as recited in claim 15, wherein said resource file is a resource bundle.

22. The method as recited in claim 1, wherein said one or more keys are free formatted strings.

23. The computer program product as recited in claim 8, wherein said one or more keys are free formatted strings.

24. The system as recited in claim 15, wherein said one or more keys are free formatted strings.

* * * * *